(12) United States Patent
Rogers et al.

(10) Patent No.: US 6,992,597 B2
(45) Date of Patent: Jan. 31, 2006

(54) SYMBOLOGY FOR REPRESENTING AIRCRAFT POSITION

(76) Inventors: Steven P. Rogers, 1522 La Vista del Oceano, Santa Barbara, CA (US) 93109; Charles N. Asbury, 1616 Esplanade, Suite 12, Redondo Beach, CA (US) 90277

(*) Notice: Subject to any disclaimer, the term of this patent is extended or adjusted under 35 U.S.C. 154(b) by 160 days.

(21) Appl. No.: 10/394,935

(22) Filed: Mar. 22, 2003

(65) Prior Publication Data

US 2004/0183697 A1    Sep. 23, 2004

(51) Int. Cl.
*G08G 1/095*    (2006.01)
(52) U.S. Cl. ............... 340/980; 340/973; 340/983; 340/948
(58) Field of Classification Search .......... 340/980, 340/973, 947–948, 954, 961, 977, 3, 14–18, 340/301–302
See application file for complete search history.

(56) References Cited

U.S. PATENT DOCUMENTS 3,052,882 A * 9/1962 Pidhayny et al. ............ 342/29
3,846,746 A * 11/1974 Trageser et al. ............ 340/961
5,313,201 A * 5/1994 Ryan ......................... 340/961

* cited by examiner

*Primary Examiner*—Daniel Wu
*Assistant Examiner*—Son Tang
(74) *Attorney, Agent, or Firm*—Donald W. Meeker

(57) ABSTRACT

A symbology system uses programmable software in a computerized system interacting with the altitude, attitude, air speed, and other flight indicators of an aircraft to create symbology in the pilot's display seen in the field of view of the pilot. The symbology represents a virtual geometric solid form, such as a vertical cylinder, always appearing perpendicular to the horizon and moving across the terrain with the aircraft in the center of the form. The pilot sees a front portion of a virtual series of horizontal circles or other shapes, spaced by a programmable distance, symbolizing the geometric solid form appearing to surround the aircraft. The geometric form references the world as-ground for use in recognizing the attitude of the aircraft-as-figure. On landing, the form appears to stop at the ground and the aircraft appears to descend within it. A virtual bank indicator line changes orientation to the geometric solid corresponding to the attitude change of the aircraft relative to the horizon.

15 Claims, 4 Drawing Sheets

SYMBOLOGY FOR REPRESENTING AIRCRAFT POSITION

BACKGROUND OF THE INVENTION

1. Field of the Invention

The present invention relates to displays for pilots of aircraft and in particular to a programmable symbology for defining a geometric form in the visual field of the pilot providing a virtual representation of a geometric shape surrounding the aircraft providing information to the pilot about the position and orientation of the aircraft and its surroundings.

2. Description of the Prior Art

Aircraft, including helicopters, are highly complex systems comprised of a large number of complex, integrated subsystems that requires frequent monitoring for safe aircraft operation. Each of these subsystems generates a significant amount of status data. Additional flight complications such as nap-of-the-earth (NOE), adverse weather, and/or night flying add to the importance of aircraft status data, and also increases the amount of monitoring required. These types of flight operations require the pilot to maintain a continual spatial awareness of aircraft orientation and/or location with respect to the external world in addition to continual monitoring of the status of aircraft subsystems.

The task of monitoring the status of the various aircraft subsystems may conflict with the tasks of maintaining continual spatial and situational awareness of the external world. To monitor the status of aircraft subsystems, the pilot may have to divert his attention from the observation of the external world outside the cockpit to reference generated status data. Such diversions may lead to losses, in varying degrees, of spatial and/or situational awareness of the external world, which, in turn, may lead to less than optimal flight control, especially during high pilot workload flight operations.

U.S. Pat. No. 5,296,854, issued Mar. 22, 1994 to Hamilton, et al., illustrates a virtual image display system providing video displays based upon virtual images of the external world having synchronized structural outlines superimposed on the video displays to a pilot operating an aircraft such as a helicopter in non-visual flight conditions. The virtual image display system includes a virtual imaging subsystem for generating virtual images of the external world, a video display subsystem for generating video images based upon the virtual images and for displaying the video images for the pilot's viewing, a sensing means for providing signals corresponding to the spatial location and perspective of the video display subsystem, a map comprising structural outlines corresponding to structural members forming the canopy structure of the helicopter, and a computer subsystem providing electronic interfacing between the elements of the virtual image display system, for synchronizing the orientation of the virtual imaging subsystem with the video display subsystem, and for processing the virtual image signals to provide signals to the video display subsystem to generate video displays. The computer utilizes the helmet position signals to define the relative position and orientation of the video display subsystem in the cockpit, and utilizes such definition to reconstruct structural outlines from the map that are synchronized to the perspective of the video images. The synchronized structural images are superimposed upon the video display.

U.S. Pat. No. 5,072,218, issued Dec. 10, 1991 to Spero et al., shows images provided to a pilot in an aircraft overflying the earth by means of a helmet mounted display system. The position and attitude of the aircraft with respect to the earth and the attitude of the helmet with respect to the aircraft are monitored in order to convert a plurality of stored earth position signals into helmet coordinates. Earth points which are viewable by the pilot are displayed using symbolic images thereof such that the symbolic images coincide, from the pilot's point of view, with the actual positions of the viewable points on the earth.

U.S. Pat. No. 4,740,779, issued Apr. 26, 1988 to Cleary, et al., describes a panoramic display system for an aircraft comprising a display screen and line generation means for generating a line image on the display screen. The position of the line image on the display screen corresponds to the position of a projection of an artifact external to the aircraft onto an imaginary window to an eye point within the aircraft. The eye point is positioned on the opposite side of the window from the artifact. The line image may be generated by determining the position of a great circle on a sphere having its center at the eye point, such that the position of the great circle corresponds to the artifact projected onto the sphere to the eye point. The position of the line image on the display screen corresponds to the position of the great circle on the sphere. The display system may comprise a plurality of display screens positioned adjacent to one another such that each can be viewed from a single viewing point. Partial line images are generated on each display screen such that the position of each partial line image corresponds to the position of the projection of the artifact onto a window portion to the eye point. The eye point is common to all window portions, and the spatial relationship of the window portions with respect to one another is congruent with the spatial relationship of the display screens with respect to one another.

U.S. Pat. No. 4,763,280, issued Aug. 9, 1988 to Robinson, et al., claims a system for the production of real-time, computer-generated images as for projection on a curvilinear surface as on the inside of a dome. A general-purpose computer provides data for visual images and supplies the data in an ordered format. Such data is processed first with regard to viewpoint and second with regard to channel operation. Specifically, viewpoint processing incorporates an object manager and a polygon manager. Channel processing includes a geometric processor and a display processor. The display processor drives a projector for illuminating a spherical surface with the desired images. The geometric processor incorporates several well known elements including a rotator, clippers, a slope calculator and polygon buffer. Additionally, the geometric processor incorporates a segmenter and mapper which replaces the traditional perspective divider to process the data so as to generate images for curvilinear projection. The segmenter tests the character of polygon edges in spherical coordinate format and corrections are performed on data in the same format. Segmentation is performed on data in a rectangular coordinate format.

U.S. Pat. No. 4,305,057, issued Dec. 8, 1981 to David R. Rolston, shows a Heads-Up Display system which displays an attitude reference to pilots in order to provide a reference display system as a primary flight instrument. The Heads-up Display system uses a pitch ladder system based on Euler angle data which eliminates the erratic motion or "flip-flop" of the typical pitch ladder which is inherent and unavoidable when pitching near plus or minus 90. degree., by utilizing a flexible graphics display which presents the pilot with a heads-up view as if he were located inside and at the center of an imaginary sphere which has heading and pitch angle information marked on its inner surface. The display of appropriately curved bars as opposed to a straight bar pitch ladder for attitude reference more realistically depicts to the pilot the aircraft situation relative to the outside world. This presentation is more easily and more reliably interpreted by the pilot and simplifies the recognition and recovery from unusual attitudes. In addition, ground track, yaw rate, turn rate information is available over the entire HUD field-of-view, thus there is no need for the pilot to redirect his attention away from his primary point of interest, the velocity vector, to obtain heading and track information. Appropriate equations are evaluated to obtain line-of-sight angles from the aircraft longitudinal axis to the desired pitch and heading points on the pitch ladder display. Such equations are solved by computer techniques for a sufficient number of intersecting points to complete the display and the graphics hardware connects the points to form the segments of the pitch ladder which represent the imaginary lines on the sphere and displays the same in the pilot's field-of-view.

What is needed is symbology in the visual field of the pilot representing the position of the aircraft in space relative to the ground or external surfaces enabling the pilot to visually determine the orientation and position of the aircraft, especially relative to landing.

SUMMARY OF THE INVENTION

An object of the present invention is to provide symbology in the visual field of a pilot which gives the pilot an easy to understand visual representation of the orientation and spatial position of the aircraft relative to the ground.

A related object of the present invention is to provide symbology created by a programmable means based on aircraft position information taken from the aircraft instruments which symbology represents a recognizable virtual shape in the space surrounding the aircraft and moving with the aircraft, the shape having visual indicators of spatial distances and orientation relative to the ground to allow the pilot to see the position and orientation of the aircraft relative to the shape and hence also relative to the ground.

Another related object of the present invention is to provide symbology in the visual field of the pilot representing a virtual geometric solid figure surrounding the aircraft with the aircraft in the center of the figure and traveling with the aircraft, the geometric solid figure maintaining a constant horizontal orientation relative to the ground, the symbology having images in the pilot's visual field of horizontal slices of the figure defined by the linear perimeter of the slices as if stacked in space separated by specified distances and surrounding the aircraft so that the pilot sees the segments of the slices that would actually be visible out the window of the cockpit if the virtual geometric solid figure were actually there surrounding the aircraft providing an instantaneous visual reference of aircraft orientation and position relative to the virtual figure.

A corollary object of the present invention is to provide symbology which uses a series of visual circles stacked in a vertical array with each circle parallel to the ground and each circle separated from the others by a specified distance to represent a virtual vertically oriented cylinder and at a specified distance from the aircraft with the aircraft in the aircraft as if the aircraft were in the center of the cylinder. Other virtual geometric solids or other shapes may be used, preferably familiar shapes. The cylinder is preferred because there is a uniform distance from the center location of the aircraft to the periphery around the entire cylinder.

A further object of the present invention is to provide symbology which uses special indicators when the aircraft is approaching the ground to alert the pilot of the position of the aircraft relative to the ground, which is especially useful in low or no visibility situations, such as landing at night or in a dusty environment like the desert.

Another further object of the present invention is to provide symbology where the virtual geometric solid figure ceases to move vertically upon touching the ground so that the aircraft appears to descend down the geometric form past each known distance indicated by the horizontal slices of the figure indicated by the peripheral lines until reaching the ground, with the bottom peripheral line a different color or other visual designation so the pilot will know when the aircraft is touching down. In addition to the apparent stopping of the vertical motion of the figure upon reaching the ground level, the symbology may utilize a change in the appearance of the top, bottom, and center peripheral lines, so the pilots will know if they are flying straight or at a perceived angle from the center line, and when they are approaching the bottom of the geometric form upon landing.

In brief, the present invention defines symbology comprising a virtual image display system that provides information pertaining to the altitude of an aircraft and its orientation with respect to the ground utilizing a geometric form, where the geometric form references the world as-ground for use in recognizing the attitude of the aircraft-as-figure. The resulting geometric form is always perpendicular to the horizon, centered on, and moving across the terrain with the aircraft. The symbology's geometric form is displayed as a series of horizontal slices stacked in space separated by a specified interval, utilizing various user-definable visual attributes to identify distinct pieces of data within the symbology set. When the aircraft has descended to the point that the lowermost of the horizontal slices has come into contact with the ground, further aircraft descent is indicated by modifying how the aircraft is represented within the geometric form.

An advantage of the present invention is that that maximum use is made of ambient visual information so that orientation is pre-attentive and automatic.

A further advantage of the present invention is that it is particularly useful to represent the aircraft's operations during non-visual flight conditions such as night and/or adverse weather flight operations.

Another advantage of the present invention is that the symbology's geometric form is displayed utilizing various user-definable visual attributes to identify distinct pieces of data within the symbology set.

Yet another advantage of this invention is because this symbology retains the world-as-ground frame of reference, the pilot never loses his spatial orientation even when there are temporary unobserved orientation changes of the aircraft.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
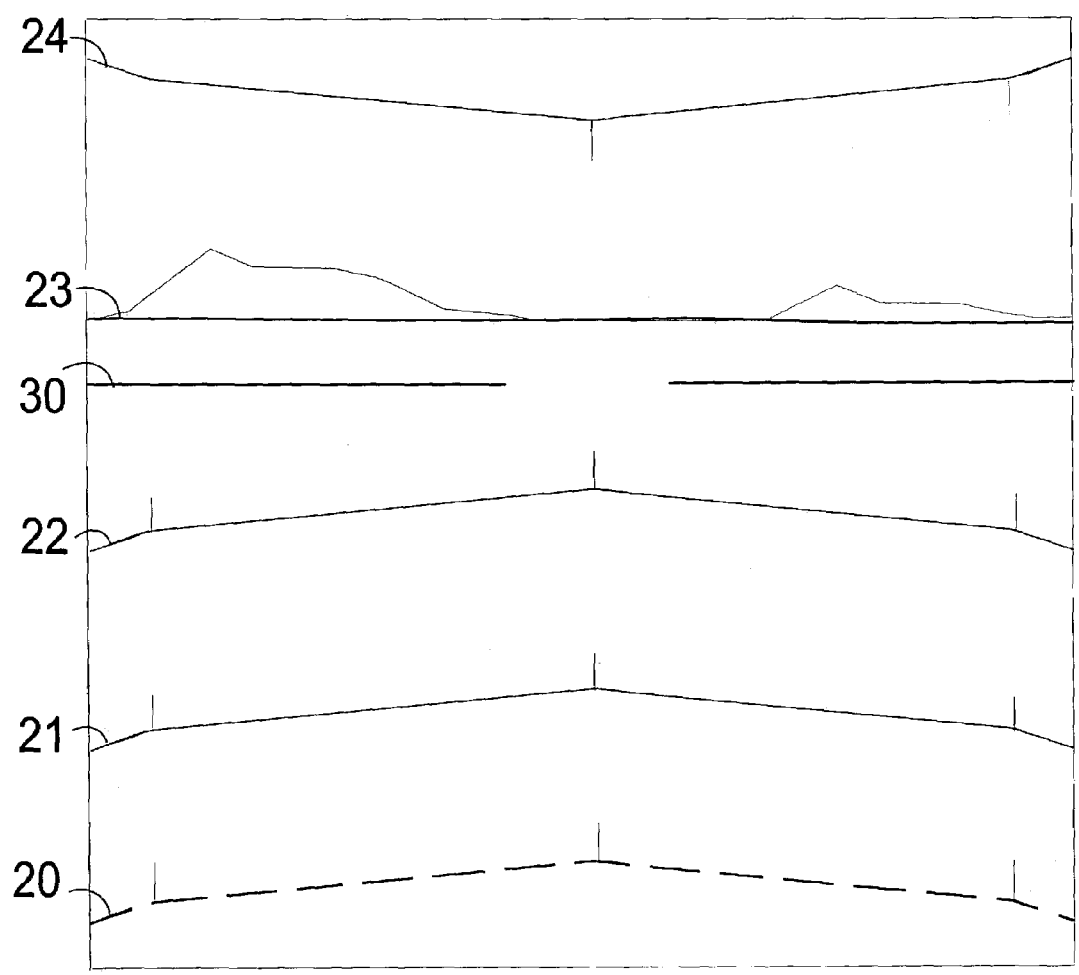
FIG. 1 is a diagram of the pilot's view of the cylindrical implementation of the geometric form of the symbology, during forward flight.
Figure 2:
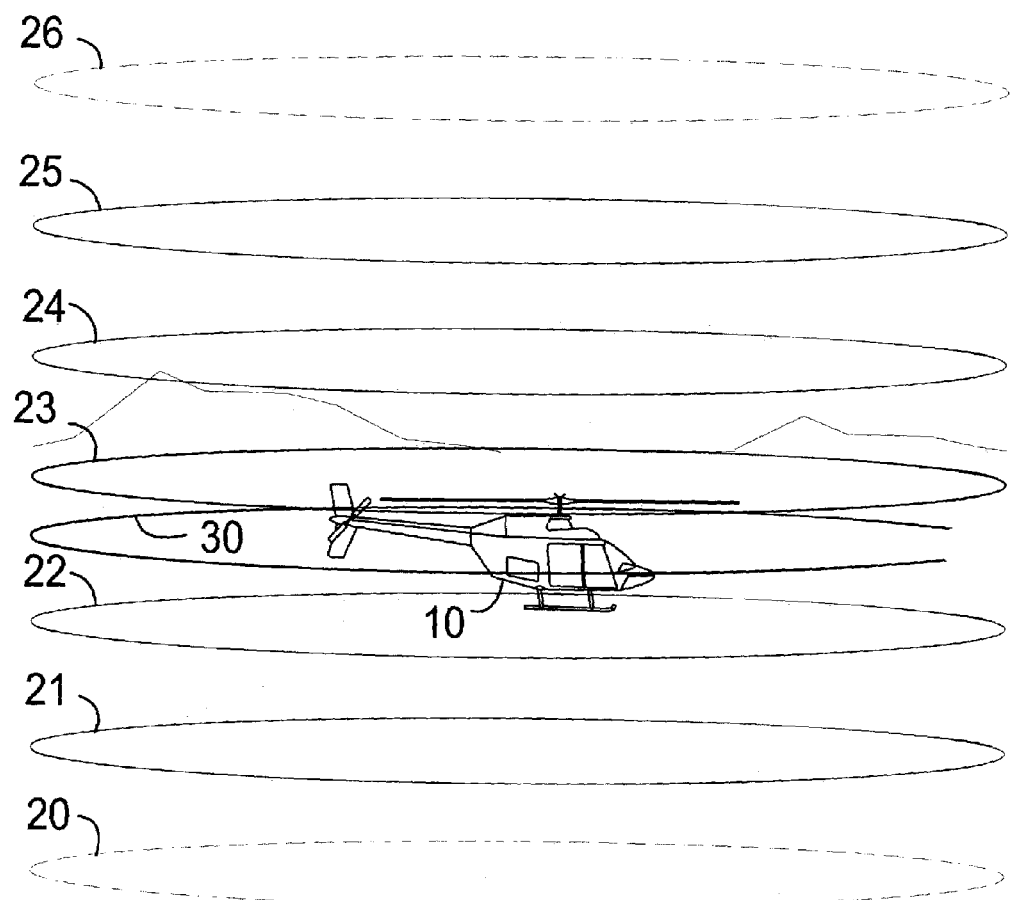
FIG. 2 is a diagram of the external representation of a cylindrical implementation of the geometric form of the symbology as viewed by the pilot in FIG. 1.
Figure 2:
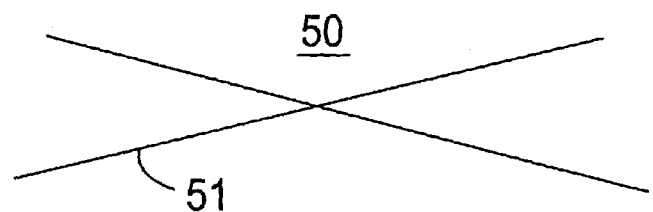
Figure 3:
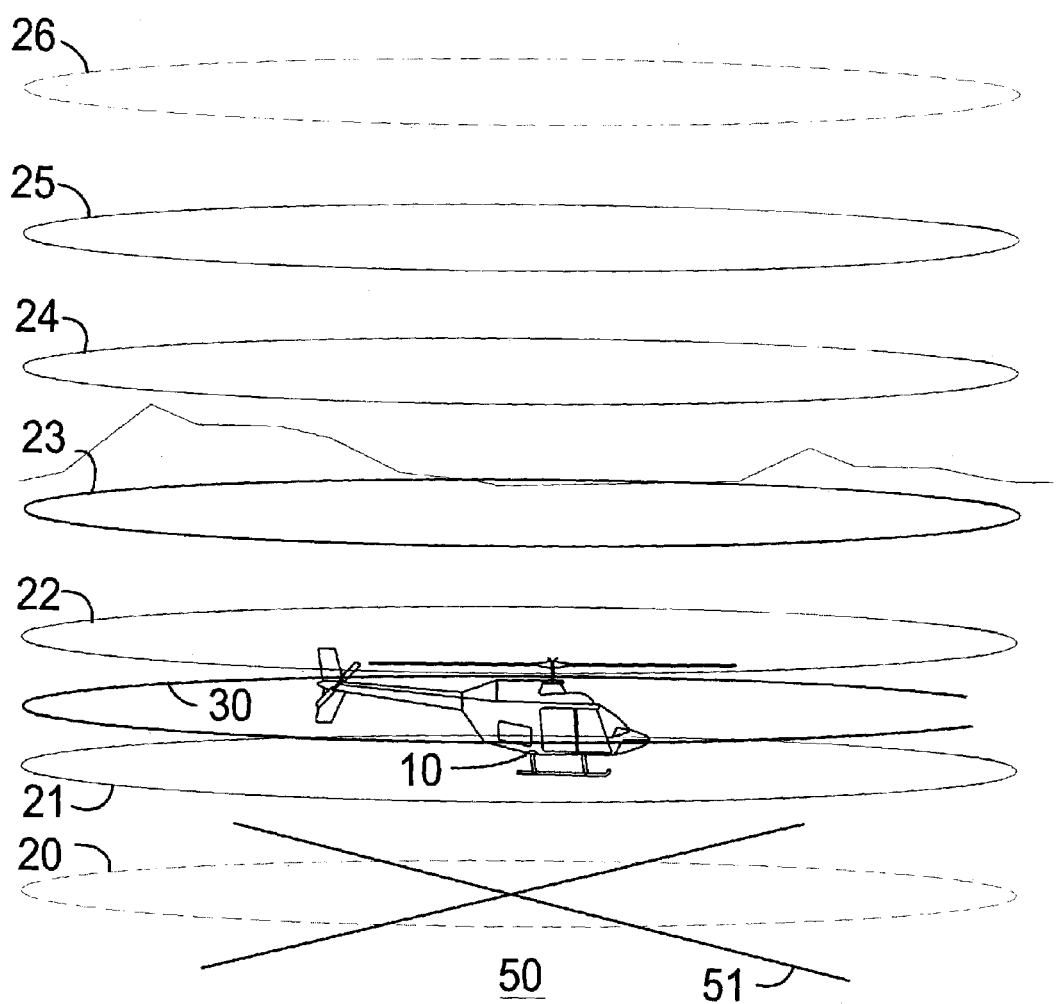
FIG. 3 is a diagram of the external representation of a cylindrical implementation of the geometric form of the symbology as the aircraft is approaching landing with the aircraft appearing to descend in the symbology geometric form with the form resting in a stationary position on the ground.
Figure 4:
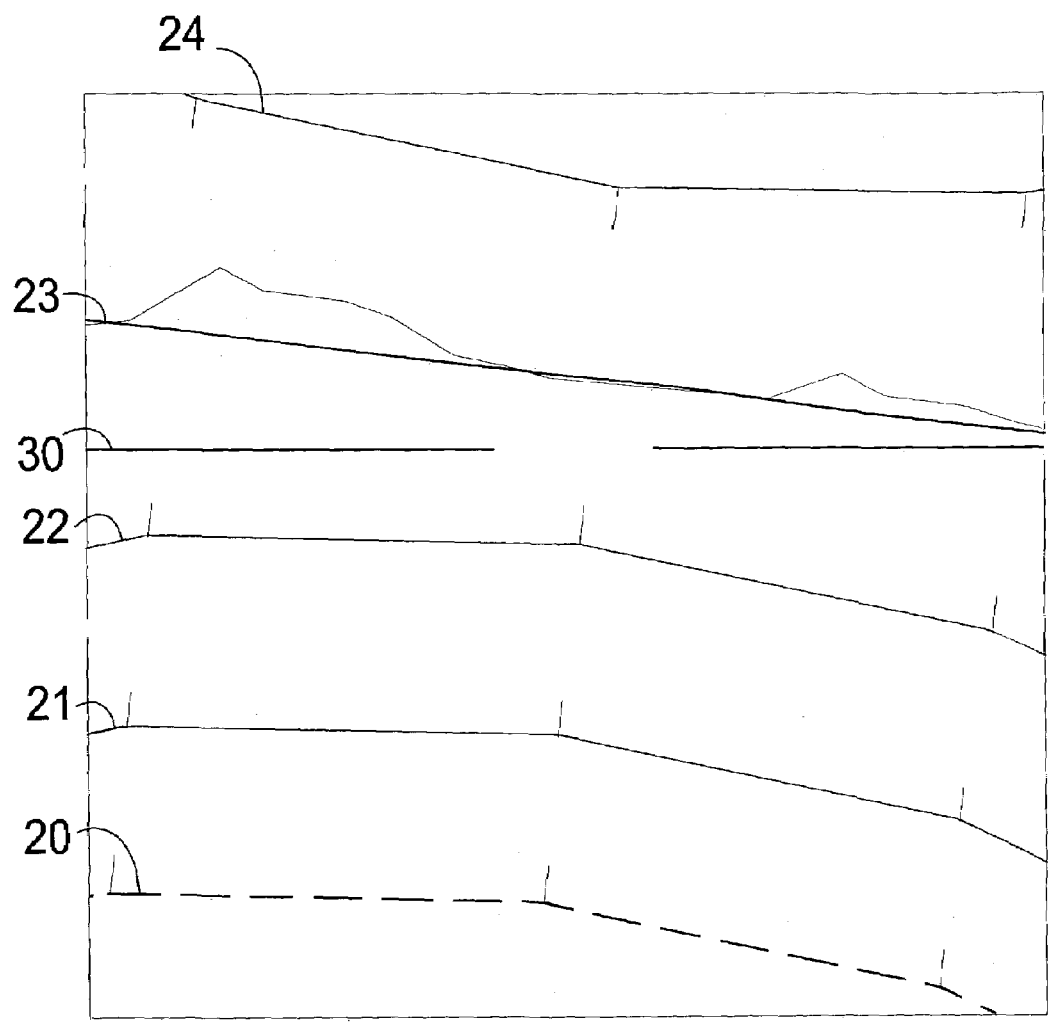
FIG. 4 is a diagram of the pilot's view of the cylindrical implementation of the geometric form of the symbology, during banking the aircraft.

In FIGS. 1–4 a symbology system comprises a means for programming information gathered from flight instruments relative to an aircraft's flight position and creating symbology representing the flight position in the visual field of a pilot as seen in FIGS. 1 and 4.

A programmable means, such as an onboard programmable computer in communication with flight position instruments and in communication with the pilot's display, as seen in FIGS. 1 and 4, gathers flight position information in real time about the aircraft from a number of instruments on the aircraft and using the flight position information, creates symbology representing the flight position information in the visual field of a pilot of the aircraft, as shown in FIGS. 1 and 4.

The symbology comprises an image representing a virtual figure, such as a cylinder represented by peripheral spaced lines 20–26 as shown in FIGS. 2 and 3, appearing to surround the aircraft, such as a helicopter 10, and travel with the aircraft and maintain a particular orientation to the actual landscape, such as the virtual figure always remaining vertical with a flat base, as indicated by dashed line 20, of the virtual figure in a horizontal orientation.

The symbology provides information to the pilot regarding distances and orientations of the aircraft relative to the virtual figure so that movements of the aircraft are viewed by the pilot as taking place within the virtual figure, as in FIGS. 1 and 4. If the aircraft banks, the bank indicator 30 in the field of view banks with the aircraft and the symbology figure appears to remain with the base horizontal so that the pilot "sees" the aircraft banking relative to the virtual figure as in FIG. 4 since in the visual field of the pilot, the bank indicator 30 symbology is banking relative to the rest of the symbology and relative to the ground 50. The bank indicator 30 is preferably an alternate color to the other lines of the display, such as a blue line, and is also differentiated from the other lines by being a broken line with a space in the middle of the line or by any other desired line style difference. The bank indicator 30 which may be another virtual slice of the geometric solid as seen in FIGS. 2 and 3, actually always appears in the pilot's field of view to be a line because the information representing the bank line comprises symbology which appears parallel to the aircraft flight deck and preferably at eye level, as seen in FIGS. 1 and 4. Any normally horizontal indicia in the heads up display or normally horizontal elements of the aircraft, such as the frame around the windshield appear to bank at an angle to each of the peripheral lines 20–26 representing the horizontal slices of the virtual figure.

The symbology is capable of assuming a recognizably different imagery when the virtual figure theoretically comes into contact with an external surface in landing, normally on the earth 50 such as on a spot marked by an X 51 in the drawing in the center of the virtual figure, so that the pilot is capable of viewing the position of the aircraft relative to the external surface using the symbology. In the preferred embodiment, the virtual image remains stationary with the bottom peripheral line 20 resting on the ground while the aircraft appears to descend within the virtual figure until the aircraft touches down on the ground 50 in the center, marked by an X 51 in FIG. 3 of the virtual figure, so that the pilot can "see" in the visual field the aircraft descending and landing within the virtual figure even if the actual outside view is obscured by flying dust or snow or water spray or any other visual barrier caused by the rotating blades of the helicopter or obscured by darkness at night or any other visual obstruction, allowing the pilot to land safely even in zero visibility.

The symbology comprises an image representing a virtual figure surrounding the aircraft 10, where the geometric form references the world as-ground for use in recognizing the attitude of the aircraft-as-figure. The virtual geometric form of the symbology is always shown with the base of the form perpendicular to the horizon, moving across the terrain with the aircraft 10 in the center of the virtual form.

In FIG. 2, the geometric form of the present invention is implemented utilizing a cylindrical form, utilizing the "world-as-ground" reference, with the aircraft 10 appearing in the middle of the cylinder. The horizontal slices stacked in space separated by specified intervals take the shape of rings 20 through 26, all parallel to the ground 50. Any set of colors may be chosen to represent the horizontal slices 20 through 26, provided that they are distinctly and immediately identifiable from other indicia in the visual field of the pilot and from the actual viewed external world outside the aircraft. The bottommost horizontal slice 20, shown dashed, can be displayed in a bright color different from the other horizontal slices, as it is closest to the ground and should stand out. Furthermore, the top and bottom horizontal slices can be displayed utilizing a double thickness of pixels in height than that used for the other horizontal slices to more easily distinguish them. It is recommended that common colors such as those utilized for symbols in any integrated helmet and display sight system not be used to represent the horizontal slices. The size of the geometric form may be defined dynamically by the aircraft pilot. The horizontal slices 20 through 26 shown in FIG. 2 are intended to represent an area 600 feet in diameter or other desired diameters. The number of spaced stacked slices within the geometric form may be defined dynamically by the aircraft pilot. The horizontal slices 20 through 26 shown in FIG. 2 are intended to represent an area 300 feet in height or other desired height. The diameter of and the interval between the spaced stacked slices within the geometric form may be defined dynamically by the aircraft pilot. The space between each horizontal slice 20 through 26 shown in FIG. 2 is intended to represent an interval of 50 feet or other desired intervals.

FIG. 1 is a diagram of the pilot's view of the cylindrical implementation of the geometric form, during forward flight. The resulting symbology with its integrated real time flight position information provides information to the pilot regarding distances and orientations of the aircraft relative to the virtual figure so that movements of the aircraft 10 are viewed by the pilot as taking place within the virtual figure. The horizontal slices stacked in space separated by specified intervals take the shape of rings 20 through 24 with a portion of the rings visible in the pilot's visual field as if they were actually there surrounding the aircraft. The horizontal slices 20 through 24 shown in FIG. 1 are intended to represent an area 600 feet in diameter or other desired diameter. The diameter and the number of spaced stacked slices within the geometric form may be defined dynamically by the aircraft pilot. The horizontal slices 20 through 24 shown in FIG. 1 are intended to represent an area 200 feet in height or other desired height. The total height of the virtual geometric figure represent an area 300 feet in height, but not all the figure is visible in the pilot's view in FIG. 1. The interval between the spaced stacked slices within the geometric form may be defined dynamically by the aircraft pilot. The space between each horizontal slice 20 through 24 shown in FIG. 1 is intended to represent an interval of 50 feet. The presence of vertical tic marks between each horizontal slice aids the pilot in judging turn rates. The tic marks always point toward the central horizon line 23, which may be a different color, such as white. Information pertaining to the smooth-earth horizon line and aircraft attitude are overlaid within the geometric form. The X 51 shown on it in the drawing to indicate the spot where the helicopter will land on the ground 50 is not part of the symbology.

The symbology assumes a recognizably different imagery when the virtual figure theoretically comes into contact with an external surface, so that the pilot is capable of viewing the position of the aircraft relative to the external surface using the symbology. One such mode of representation is diagrammed in FIG. 3, which indicates that the aircraft 10 has descended within the geometric form appearing to rest on the ground 50 with the X 51 shown in the drawing in the center of the cylinder to indicate the spot where the helicopter will land. In FIG. 3, the geometric form remains stationary while the aircraft 10 sinks inside the geometric form toward the ground 50. Another possible implementation could be to collapse the geometric form once the bottommost horizontal slice 20 comes into contact with the ground 50. This would result in the geometric form getting smaller as the aircraft 10 descends towards the ground 50.

The present invention can be implemented utilizing many forms and visual cues, of which the above-described cylindrical display is only one. The key to this symbology is to retain the world-as-ground frame of reference even when there are temporary unobserved changes with the aircraft, so that the pilot never loses his spatial orientation.

It is understood that the preceeding description is given merely by way of illustration and not in limitation of the invention and that various modifications may be made thereto without departing from the spirit of the invention as claimed.

What is claimed is:

1. A symbology system for programming information relative to an aircraft's flight position to create symbology representing the flight position in the visual field of a pilot, the system comprising:

a programmable means for gathering flight position information in real time about an aircraft from a number of instruments on the aircraft and using the flight position information to create symbology representing the flight position information in the visual field of a pilot of the aircraft;

the symbology comprising an image representing a virtual figure surrounding the aircraft and traveling with the aircraft and maintaining a particular orientation to the actual landscape, the symbology providing information to the pilot regarding distances and orientations of the aircraft relative to the virtual figure so that movements of the aircraft are viewed by the pilot as taking place within the virtual figure, the symbology assuming a recognizably different imagery when the virtual figure theoretically comes into contact with an external surface upon landing so that the pilot is capable of viewing the position of the aircraft relative to the external surface using the symbology, the virtual figure appearing in the visual field of the pilot in a heads up display so that the pilot sees the virtual figure that would actually be visible out the window of the cockpit if the virtual figure were actually there surrounding the aircraft providing an instantaneous visual reference of aircraft orientation and position relative to the virtual figure.

2. The symbology system of claim 1 wherein the recognizably different imagery when the virtual figure theoretically comes into contact with an external surface in a landing operation on the external surface comprises the virtual image represented in a virtual vertically stationary position resting on the external surface and the aircraft appearing to descend within the virtual image.

3. The symbology system of claim 1 wherein the virtual figure is a virtual geometric solid figure represented in the visual field of the pilot by a series of spaced stacked slices of the peripheral edges of the slices seen as defining the portion of the virtual figure which would be visible to the pilot if the figure were actually surrounding the aircraft.

4. The symbology system of claim 1, utilizing the world as-ground for recognizing the attitude of the aircraft-as-figure.

5. A symbology system for programming information relative to an aircraft's flight position to create symbology representing the flight position in the visual field of a pilot, the system comprising:

a programmable means for gathering flight position information in real time about an aircraft from a number of instruments on the aircraft and using the flight position information to create symbology representing the flight position information in the visual field of a pilot of the aircraft;

the symbology comprising an image representing a virtual figure surrounding the aircraft and traveling with the aircraft and maintaining a particular orientation to the actual landscape, the symbology providing information to the pilot regarding distances and orientations of the aircraft relative to the virtual figure so that movements of the aircraft are viewed by the pilot as taking place within the virtual figure, the symbology assuming a recognizably different imagery when the virtual figure theoretically comes into contact with an external surface so that the pilot is capable of viewing the position of the aircraft relative to the external surface using the symbology, the virtual figure comprising a virtual geometric solid figure represented in the visual field of the pilot by a series of spaced stacked slices of the peripheral edges of the slices seen as defining the portion of the virtual figure which would be visible to the pilot if the figure were actually surrounding the aircraft.

6. The symbology system of claim 5, wherein information representing a smooth-earth horizon line and aircraft attitude may be displayed in conjunction with the virtual geometric solid figure.

7. The symbology system of claim 6, wherein a line of vertical tic marks may be displayed in conjunction with the geometric form between each of the spaced stacked slices, the line of vertical tic marks pointing towards the horizon line.

8. The symbology system of claim 5, wherein information representing a bank line and aircraft attitude may be displayed in conjunction with the virtual geometric solid figure.

9. The symbology system of claim 8, wherein information representing the bank line comprises symbology which appears parallel to the aircraft flight deck.

10. The symbology system of claim 5, where the number of spaced stacked slices within the virtual geometric solid figure may be defined dynamically by the aircraft pilot.

11. The symbology system of claim 5, where the diameter of and the interval between the spaced stacked slices within the virtual geometric solid may be defined dynamically by the pilot of the aircraft.

12. The symbology system of claim 5, wherein the recognizably different imagery when the virtual figure theoretically comes into contact with an external surface in a landing operation on the external surface comprises the geometric solid figure represented in a virtual vertically stationary position resting on the external surface and a visual representation of the descent of the aircraft within the geometric solid figure upon landing.

13. The symbology system of claim 12, further comprising a visual representation of the aircraft coming into contact with the external surface upon landing.

14. The symbology system of claim 5, wherein color attributes of the symbology may be defined dynamically by the pilot of the aircraft.

15. The symbology system of claim 5, where a size of the virtual form may be defined dynamically by the pilot of the aircraft.

* * * * *